(12) United States Patent
Panicacci

(10) Patent No.: US 7,372,493 B2
(45) Date of Patent: May 13, 2008

(54) COLUMN-WISE CLAMP VOLTAGE DRIVER FOR SUPPRESSION OF NOISE IN AN IMAGER

(75) Inventor: Roger Panicacci, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 696 days.

(21) Appl. No.: 10/887,892

(22) Filed: Jul. 12, 2004

(65) Prior Publication Data

US 2006/0007329 A1    Jan. 12, 2006

(51) Int. Cl.
*H04N 3/14* (2006.01)
*H04N 5/16* (2006.01)

(52) U.S. Cl. ...................... 348/308; 348/257
(58) Field of Classification Search ............. 348/222.1, 348/241–243, 245, 257, 308; 382/254, 274, 382/275
See application file for complete search history.

(56) References Cited

U.S. PATENT DOCUMENTS

| | | | |
|---|---|---|---|
| 5,144,444 A * | 9/1992 | MacLean | 348/312 |
| 5,717,457 A * | 2/1998 | Morimoto | 348/241 |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 7,081,921 B2 * | 7/2006 | Nitta et al. | 348/229.1 |
| 2003/0052982 A1 | 3/2003 | Chieh | |
| 2003/0063213 A1 * | 4/2003 | Poplin | 348/362 |
| 2003/0085340 A1 | 5/2003 | Street | |
| 2003/0189209 A2 | 10/2003 | Tay | |
| 2003/0214596 A1 | 11/2003 | Simony | |
| 2003/0231252 A1 | 12/2003 | Findlater et al. | |
| 2004/0051797 A1 | 3/2004 | Kelly et al. | |
| 2005/0243194 A1 * | 11/2005 | Xu | 348/241 |
| 2006/0146164 A1 * | 7/2006 | Mori et al. | 348/311 |

* cited by examiner

*Primary Examiner*—Tuan Ho
*Assistant Examiner*—Timothy J Henn
(74) *Attorney, Agent, or Firm*—Dickstein Shapiro LLP

(57) ABSTRACT

An imager having column-wise clamp voltage drivers. Each clamp voltage driver is substantially identical to the output circuitry of the imager's pixels in that column and is designed to track the noise experienced by the readout pixels. Each clamp voltage driver generates and drives the appropriate clamp voltage to store reset and pixel signals in associated column sample and hold circuitry while suppressing the noise typically experienced during the readout process.

28 Claims, 7 Drawing Sheets

COLUMN-WISE CLAMP VOLTAGE DRIVER FOR SUPPRESSION OF NOISE IN AN IMAGER

FIELD OF THE INVENTION

The invention relates generally to imaging devices and more particularly to a column-wise clamp voltage driver for the suppression of noise in an imaging device.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140, 630, 6,376,868, 6,310,366, 6,326,652, 6,204,524 and 6,333, 205, assigned to Micron Technology, Inc., which are hereby incorporated by reference in their entirety.

FIG. 1 illustrates a portion of a conventional CMOS imager 10. The illustrated imager 10 includes a pixel 20, one of many that are in a pixel array (not shown), connected to a column sample and hold circuit 40 by a pixel output line 32. The imager 10 also includes a readout or programmable gain amplifier (PGA) 70 and an analog-to-digital converter (ADC) 80.

The illustrated pixel 20 includes a photosensor 22 (e.g., photodiode, photogate, etc.), transfer transistor 24, floating diffusion region FD, reset transistor 26, source follower transistor 28 and row select transistor 30. FIG. 1 also illustrates parasitic capacitance Cp1 associated with the pixel's 20 substrate. The photosensor 22 is connected to the floating diffusion region FD by the transfer transistor 24 when the transfer transistor 24 is activated by a transfer control signal TX. The reset transistor 26 is connected between the floating diffusion region FD and an array pixel supply voltage Vaa-pix. A reset control signal RST is used to activate the reset transistor 26, which resets the floating diffusion region FD (as is known in the art).

The source follower transistor 28 has its gate connected to the floating diffusion region FD and is connected between the array pixel supply voltage Vaa-pix and the row select transistor 30. The source follower transistor 28 converts the stored charge at the floating diffusion region FD into an electrical output voltage signal. The row select transistor 30 is controllable by a row select signal SELECT for selectively connecting the source follower transistor 28 and its output voltage signal to the pixel output line 32.

The column sample and hold circuit 40 includes a bias transistor 56, controlled by a control voltage Vln_bias, that is used to bias the pixel output line 32. The pixel output line 32 is also connected to a first capacitor 44 thru a sample and hold reset signal switch 42. The sample and hold reset signal switch 42 is controlled by the sample and hold reset control signal SAMPLE_RESET. The pixel output line 32 is also connected to a second capacitor 54 thru a sample and hold pixel signal switch 52. The sample and hold pixel signal switch 52 is controlled by the sample and hold pixel control signal SAMPLE_SIGNAL. The switches 42, 52 are typically MOSFET transistors.

A second terminal of the first capacitor 44 is connected to the amplifier 70 via a first column select switch 50, which is controlled by a column select signal COLUMN_SELECT. The second terminal of the first capacitor 44 is also connected to a clamping voltage VCL via a first clamping switch 46. Similarly, the second terminal of the second capacitor 54 is connected to the amplifier 70 by a second column select switch 60, which is controlled by the column select signal COLUMN_SELECT. The second terminal of the second capacitor 54 is also connected to the clamping voltage VCL by a second clamping switch 48.

The clamping switches 46, 48 are controlled by a clamping control signal CLAMP. As is known in the art, the clamping voltage VCL is used to place a charge on the two capacitors 44, 54 when it is desired to store the reset and pixel signals, respectively (when the appropriate sample and hold control signals SAMPLE_RESET, SAMPLE_SIGNAL are also generated).

Referring to FIGS. 1 and 2, in operation, the row select signal SELECT is driven high, which activates the row select transistor 30. When activated, the row select transistor 30 connects the source follower transistor 28 to the pixel output line 32. The clamping control signal CLAMP is then driven high to activate the clamping switches 46, 48, allowing the clamping voltage VCL to be applied to the second terminal of the sample and hold capacitors 44, 54. The reset signal RST is then pulsed to activate the reset transistor 26, which resets the floating diffusion region FD. The signal on the floating diffusion region FD is then sampled when the sample and hold reset control signal SAMPLE_RESET is pulsed. At this point, the first capacitor 44 stores the pixel reset signal $V_{rst}$.

Immediately afterwards, the transfer transistor control signal TX is pulsed, causing charge from the photosensor 22 to be transferred to the floating diffusion region FD. The signal on the floating diffusion region FD is sampled when the sample and hold pixel control signal SAMPLE_SIGNAL is pulsed. At this point, the second capacitor 54 stores a pixel image signal $V_{sig}$. A differential signal ($V_{rst}$-$V_{sig}$) is produced by the differential amplifier 70. The differential signal is digitized by the analog-to-digital converter 80. The analog-to-digital converter 80 supplies the digitized pixel signals to an image processor (not shown), which forms a digital image output.

As can be seen from FIG. 1, most of the pixel readout circuitry is designed to be fully differential to suppress noise (substrate or power supply noise), which could create undesirable image artifacts (e.g., flickering pixels, grainy still images). The readout circuitry for the illustrated four transistor ("4T") pixel, and known three transistor ("3T") pixels, however, is single ended. Because the reset and pixel signal levels are sampled at different times, any random noise on the supply or reference lines is superimposed on the signals and inadvertently stored on the sampling capacitors 44, 54.

FIG. 3 illustrates portions of the imager 10 that are subject to substrate noise (e.g., at the floating diffusion region FD in the pixel 20 (arrow A) and the bias transistor 56 in the sample and hold circuitry 40 (arrow B)) and noise on the clamp voltage VCL reference (e.g., at clamping switches 46, 48 (arrow C)). Although not shown, there may also be noise on the array pixel supply voltage Vaa-pix. In operation, if there is noise on the clamp voltage VCL reference, the noise is captured on the respective sampling capacitor 44, 54 when the sample and hold reset control signal SAMPLE_RESET or the sample and hold pixel control signal SAMPLE_SIGNAL turns off.

It is especially difficult to reduce substrate noise when a device or chip uses high speed clocks with large loads or when the device/chip's output pads are switching. To compensate for this, clock switching and output pad switching are typically minimized. Unfortunately, some noise remains and the minimization of the clock and output pad switching puts undesirable constraints on the imager's design.

During the readout operation, the imager may experience pixel-wise random noise and noise that varies across the row of pixels. When a gain is applied to the readout pixel signals, the noise becomes visible, which is undesirable. Accordingly, there is a desire and need to prevent readout noise from impairing acquired imager images.

SUMMARY

The invention provides an imager that prevents readout noise from impairing acquired images.

Various exemplary embodiments of the invention provide an imager having column-wise clamp voltage drivers. Each clamp voltage driver is substantially identical to the output circuitry of the imager's pixels in that column and is designed to track the noise experienced by the readout pixels. Each clamp voltage driver generates and drives the appropriate clamp voltage to store reset and pixel signals in associated column sample and hold circuitry while suppressing the noise typically experienced during the readout process.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
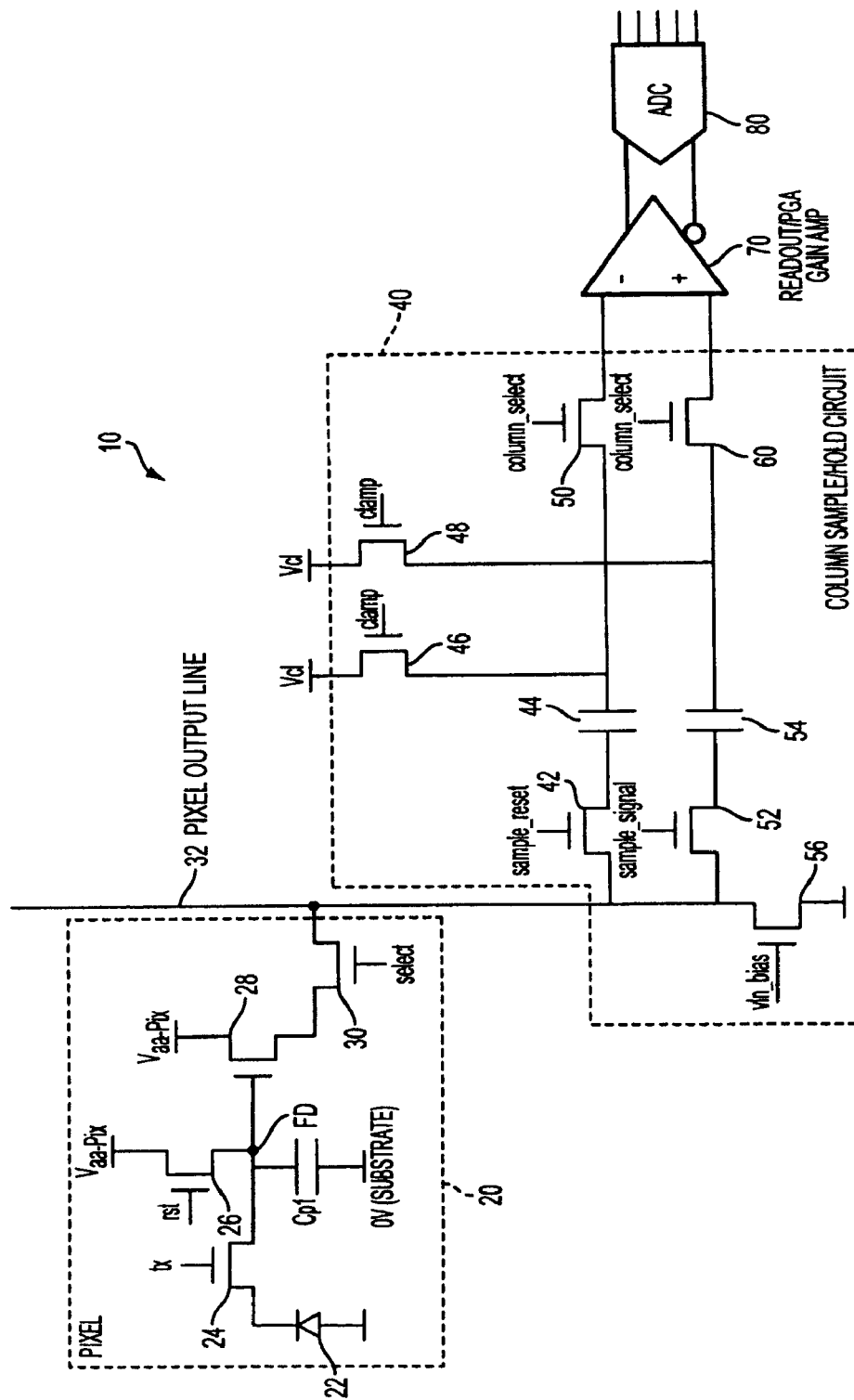
FIG. 1 is a diagram of a portion of a typical CMOS imager.
Figure 2:
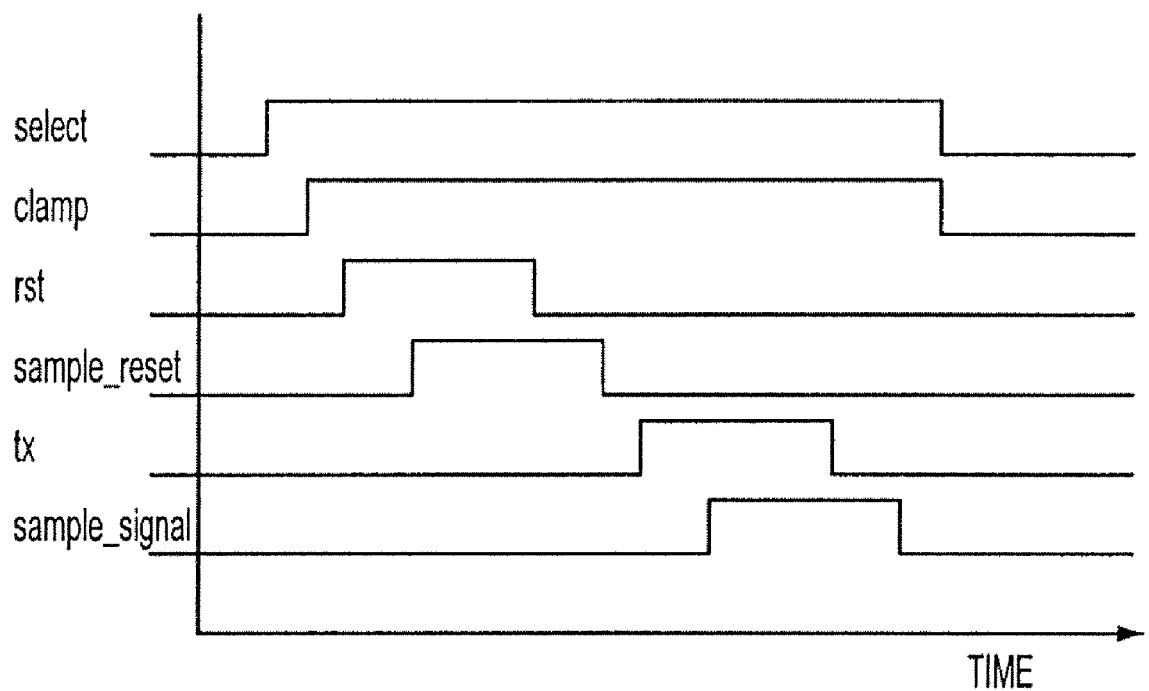
FIG. 2 is a timing diagram of the operation of the FIG. 1 imager.
Figure 3:
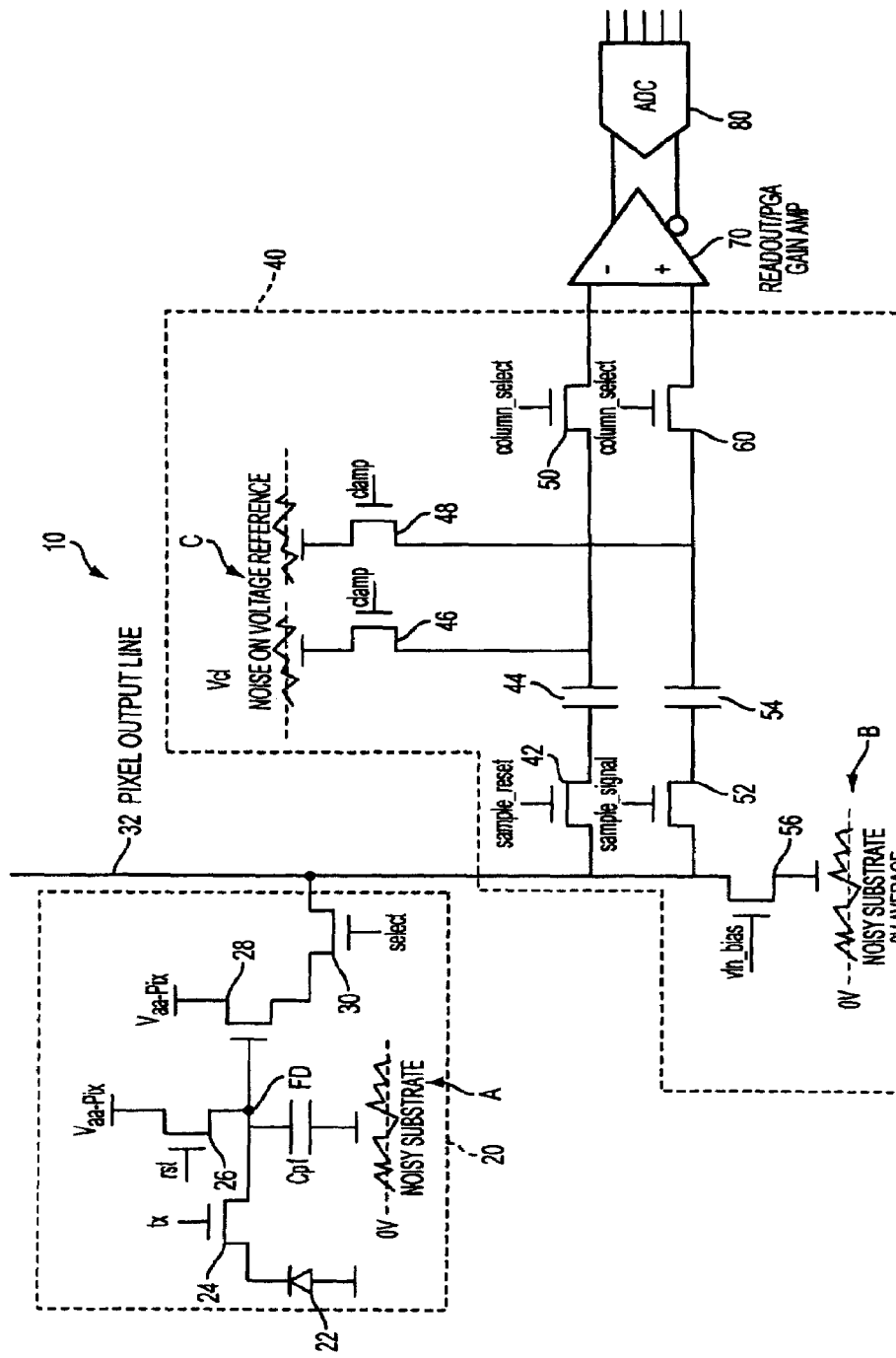
FIG. 3 is a diagram illustrating noise sources in the FIG. 1 imager.
Figure 4:
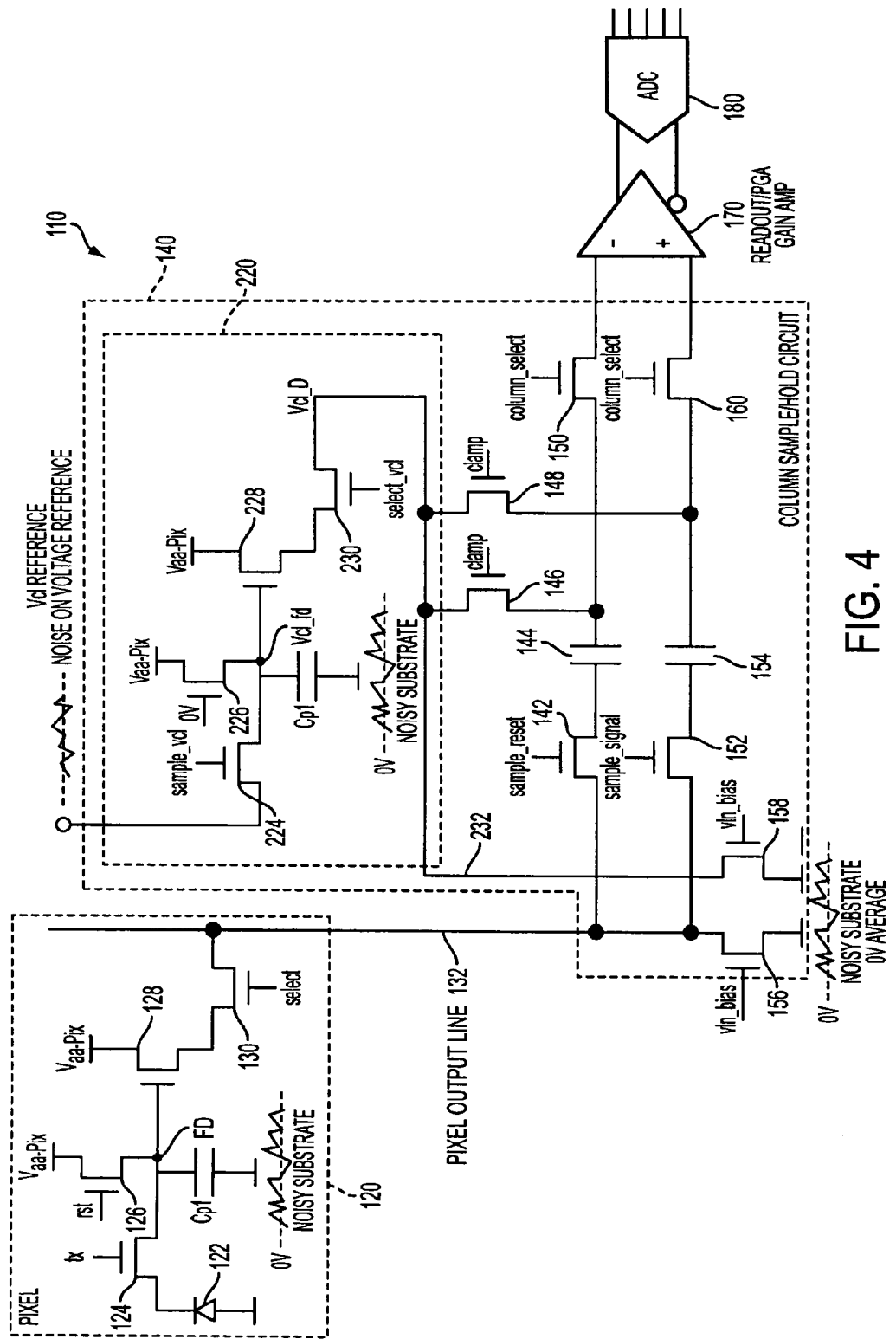
FIG. 4 is a diagram of a portion of a CMOS imager constructed in accordance with an exemplary embodiment of the invention.

Referring to the figures, where like reference numbers designate like elements, FIG. 4 shows of a portion of a CMOS imager 110 constructed in accordance with an exemplary embodiment of the invention. The illustrated imager 110 includes a pixel 120, one of many that are in a pixel array (not shown), connected to a column sample and hold circuit 140 by a pixel output line 132. As is discussed below in more detail, the column sample and hold circuit 140 includes a clamp voltage driver 220 designed to track the noise experienced by the pixel 120 and to generate and drive the appropriate clamp voltage VCL on an output line 232, enabling reset and pixel signals to be stored while suppressing the noise typically experienced during the readout process. The imager 110 also includes a readout or programmable gain amplifier (PGA) 170 and an analog-to-digital converter (ADC) 180.

The illustrated pixel 120 includes a photosensor 122 (e.g., photodiode, photogate, etc.), transfer transistor 124, floating diffusion region FD, reset transistor 126, source follower transistor 128 and row select transistor 130. FIG. 4 also illustrates parasitic capacitance Cp1 associated with the pixel's 120 substrate. The photosensor 122 is connected to the floating diffusion region FD by the transfer transistor 124 when the transfer transistor 124 is activated by a transfer control signal TX. The reset transistor 126 is connected between the floating diffusion region FD and an array pixel supply voltage Vaa-pix. A reset control signal RST is used to activate the reset transistor 126, which resets the floating diffusion region FD (as is known in the art).

The source follower transistor 128 has its gate connected to the floating diffusion region FD and is connected between the array pixel supply voltage Vaa-pix and the row select transistor 130. The source follower transistor 128 converts the stored charge at the floating diffusion region FD into an electrical output voltage signal. The row select transistor 130 is controllable by a row select signal SELECT for selectively connecting the source follower transistor 128 and its output voltage signal to the pixel output line 132.

Similar to the pixel 120, the clamp voltage driver 220 includes a transfer transistor 224, floating diffusion region VCL_FD, reset transistor 226, source follower transistor 228 and row select transistor 230. The driver 220 also experiences the same parasitic capacitance Cp1, associated with the noisy substrate, that is experienced by the pixel 120. Instead of having a photosensor, the driver 220 inputs a VCL reference voltage from a VCL reference voltage source.

In operation, the VCL reference voltage is connected to and stored in the floating diffusion region VCL_FD by the transfer transistor 224 when the transfer transistor 224 is activated by a sample VCL control signal SAMPLE_VCL. The reset transistor 226 is connected between the driver's 220 floating diffusion region VCL_FD and the array pixel supply voltage Vaa-pix. The operation of the driver 220 does not require the floating diffusion region VCL_FD to be reset; thus, the reset transistor 226 has its gate connected to a ground potential (shown as 0V) so that the transistor 226 is never conducting.

The source follower transistor 228 has its gate connected to the floating diffusion region VCL_FD and is connected between the array pixel supply voltage Vaa-pix and the row select transistor 230. The source follower transistor 228 converts the stored VCL reference voltage into an electrical output voltage signal representing the driven output clamp voltage (VCL_D). The row select transistor 230 is controllable by a row select signal SELECT_VCL for selectively connecting the source follower transistor 228 and its driven output clamp voltage signal VCL_D to the driver output line 232.

The column sample and hold circuit 140 includes two bias transistors 156, 158 controlled by a control voltage Vln_bias. The two bias transistors 156, 158 are used to bias the pixel output line 132 and the clamp driver output line 232. The pixel output line 132 is also connected to a first capacitor 144 thru a sample and hold reset signal switch 142. The sample and hold reset signal switch 142 is controlled by the sample and hold reset control signal SAMPLE_RESET. The pixel output line 132 is also connected to a second capacitor 154 thru a sample and hold pixel signal switch 152. The sample and hold pixel signal switch 152 is controlled by the sample and hold pixel control signal SAMPLE_SIGNAL. The switches 142, 152 may be MOSFET transistors or any other suitable switching devices.

A second terminal of the first capacitor 144 is connected to the amplifier 170 via a first column select switch 150, which is controlled by a column select signal COLUMN_SELECT. The second terminal of the first capacitor 144 is also connected to the clamp driver output line 232 (and thus, the driven clamp voltage VCL_D) via a first clamping switch 146. Similarly, the second terminal of the second capacitor 154 is connected to the amplifier 170 by a second column select switch 160, which is controlled by the column select signal COLUMN_SELECT. The second terminal of the second capacitor 154 is also connected to the clamp driver output line 232 (and thus, the driven clamp voltage VCL_D) via a second clamping switch 148.

The clamping switches 146, 148 are controlled by a clamping control signal CLAMP. Thus, when the clamping control signal CLAMP is generated, the driven clamp voltage VCL_D from the driver 220 is applied to the second terminals of the two capacitors 144, 154. The driven clamping voltage VCL_D is used to place a charge on the two capacitors 144, 154 when it is desired to store the reset and pixel signals, respectively (when the appropriate sample and hold control signals SAMPLE_RESET or SAMPLE_SIGNAL are also generated).

To remove noise during the pixel readout process, the column-wise clamp voltage driver 220 generates and drives a clamp voltage VCL_D using a circuit that is substantially similar to the pixel 120 being read. The driver 220 tracks the noise experienced by the pixel 120 since they use substantially the same circuitry. In addition, the pixel and driver output lines 132, 232 are both biased in the same manner (biasing transistors 156, 158) and thus, experience the same noise when biased. Because the difference between the clamp level and pixel output level is stored on the sample and hold capacitors 144, 154, much, if not all, of the readout noise is suppressed by the invention.

Figure 5:
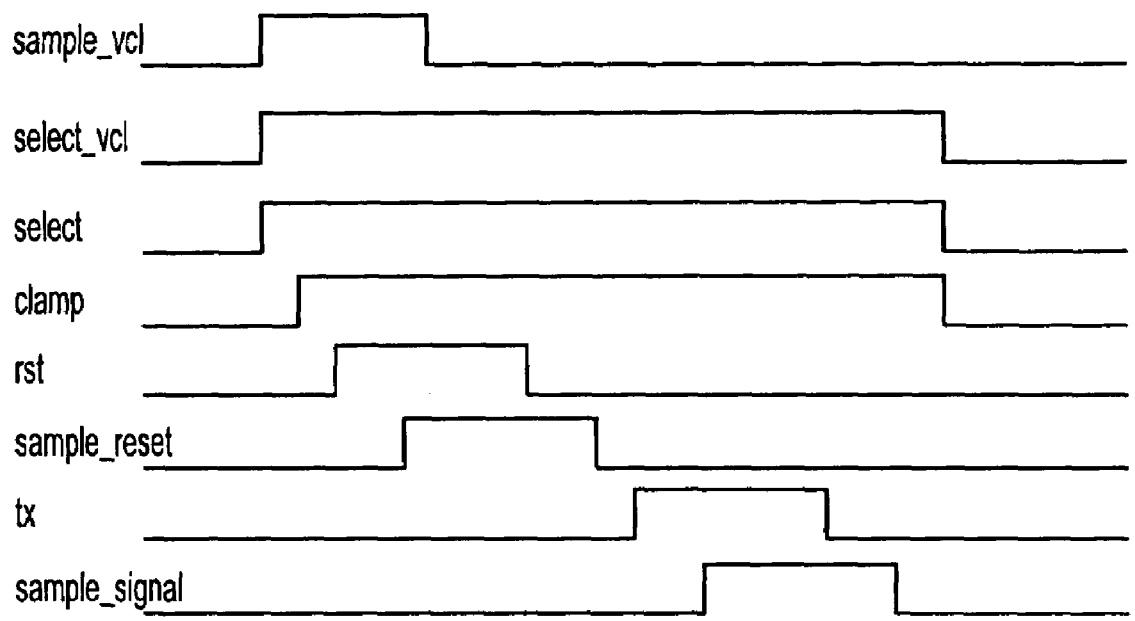
FIG. 5 is a timing diagram of the operation of the FIG. 1 imager.

Referring now to FIGS. 4 and 5, to avoid creating additional kTc noise during the sampling of the VCL reference into the driver 220, the SAMPLE_VCL signal is asserted only one time to store the VCL reference voltage on the driver's 220 floating diffusion region VCL_FD. The VCL reference voltage is sampled through the transfer transistor 224 when it is activated by the SAMPLE_VCL signal. This stored VCL reference level is held during the subsequent readout of the reset and pixel signals $V_{rst}$, $V_{sig}$ from the pixel 120.

Once the VCL reference voltage is stored on the floating diffusion region VCL_FD, the source follower transistor 228 generates the driven clamp voltage VCL_D. The driven clamp voltage VCL_D is applied to the driver output line 232 when the SELECT_VCL signal is asserted. The pixel's 120 row select transistor 130 is activated by the row select signal SELECT. When activated, the row select transistor 130 connects the source follower transistor 128 to the pixel output line 132.

The clamping control signal CLAMP is then driven high to activate the clamping switches 146, 148, allowing the driven clamp voltage VCL_D to be applied to the second terminal of the sample and hold capacitors 144, 154. The reset signal RST is pulsed to activate the reset transistor 126, which resets the floating diffusion region FD of the pixel 120. The signal on the pixel's 120 floating diffusion region FD is sampled when the sample and hold reset control signal SAMPLE_RESET is pulsed. At this point, the first capacitor 144 stores the pixel reset signal $V_{rst}$ without noise typically experienced during the readout process.

Immediately afterwards, the transfer transistor control signal TX is pulsed, causing charge from the photosensor 122 to be transferred to the floating diffusion region FD of the pixel 120. The signal on the pixel's 120 floating diffusion region FD is sampled when the sample and hold pixel control signal SAMPLE_SIGNAL is pulsed. At this point, the second capacitor 154 stores a pixel image signal $V_{sig}$ without noise typically experienced during the readout process.

It is desirable to shield the driver circuitry 220 (discussed below with respect to FIG. 6) to avoid leakage of the driver's 220 storage or floating diffusion region VCL_FD during the readout. As can be seen from FIG. 5, the storage/floating diffusion region VCL_FD is refreshed before each row of pixels is readout (i.e., the VCL reference is transferred to the driver's 220 floating diffusion region VCL_FD when the SAMPLE_VCL signal is pulsed). It should be noted that the clamp voltage VCL reference level must be sampled onto the driver's 220 floating diffusion region VCL_FD, instead of being continuously driven onto the region VCL_FD, in order to duplicate the impedance of the pixel's 120 floating diffusion region FD. With this impedance duplication, noise picked up by the pixel 120 and the driver 220 will be identical for substrate, supply and bias noise (i.e., Vln_bias).

It should be noted that the SAMPLE_VCL signal may require boosting to prevent a voltage drop across the driver's 220 transfer transistor 224. Any boosting technique may be used. Because some of the pixel parasitic noise is voltage dependent, it is desirable to have the clamp voltage level placed at a level between the pixel reset and pixel signal levels (e.g., as a compromise solution for tracking noise on the floating diffusion region FD during the reset and signal sampling phases).

Figure 6:
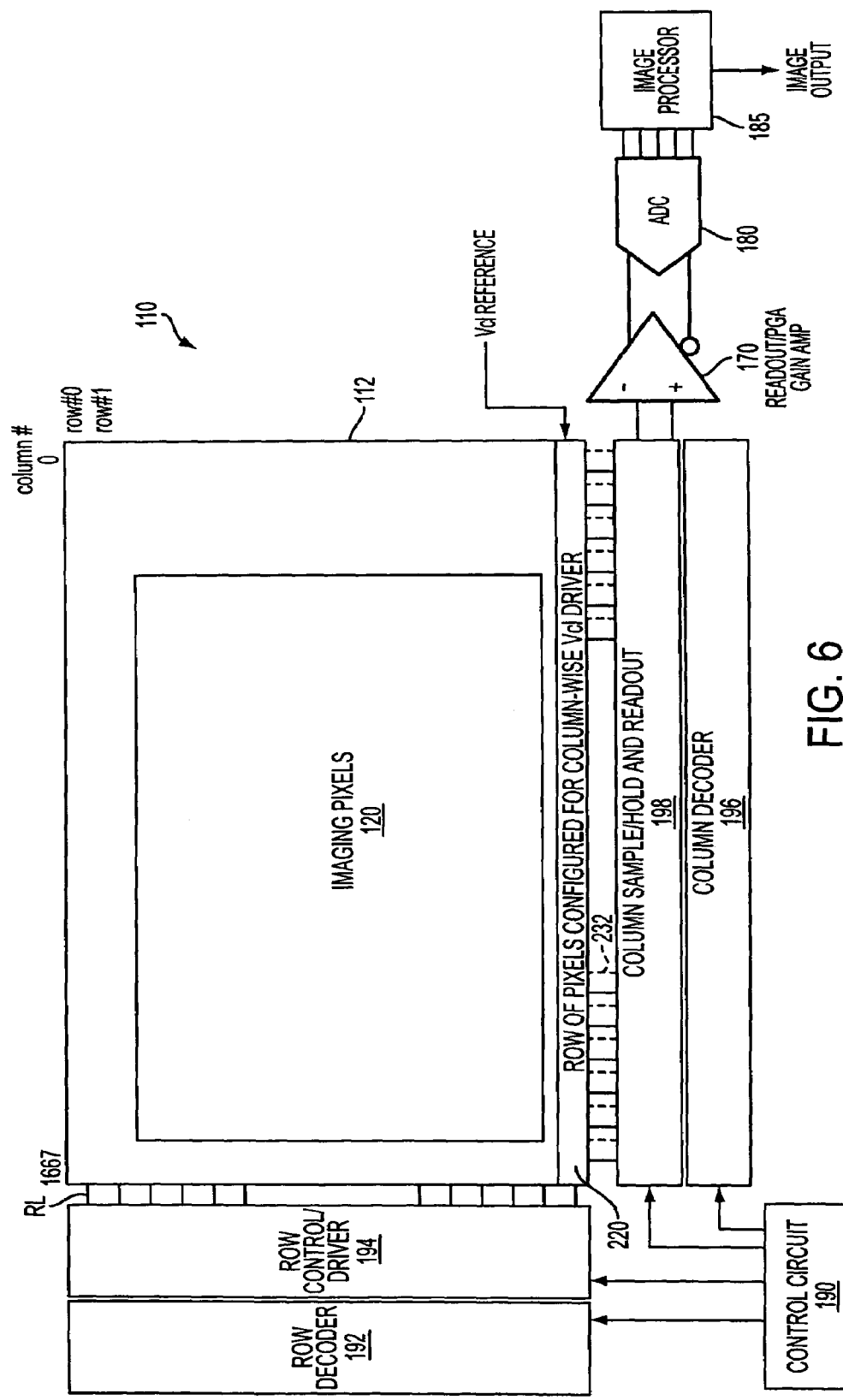
FIG. 6 illustrates an exemplary CMOS imaging device constructed in accordance with an exemplary embodiment of the invention.

FIG. 6 illustrates a CMOS imager 110 constructed in accordance with the invention. The imager 110 includes a pixel array 112 comprised of active imaging pixels 120 and a row of pixels configured as column-wise clamp voltage drivers 220 (discussed above with respect to FIG. 4). The pixels 120 may be the 4T pixel illustrated in FIG. 4, or other types of pixels suitable for use in a CMOS imager (e.g., 3T, 5T, etc.). That is, the invention is not limited to any particular pixel configuration. All that is required is that the drivers 220 have the same transistor configuration as the imaging pixels 120 so that the drivers 220 may accurately track the noise on the pixels 120 during the readout process.

In a preferred embodiment, the drivers 220 are light shielded. One technique for shielding the drivers 220 is to cover them with metal. In addition, it is also desirable to modify the diffusion region VCL_FD of the driver 220. The driver's 220 floating diffusion region VCL_FD is modified from the pixel's 120 floating diffusion region FD to allow a low impedance contact at the driver's 220 floating diffusion region VCL_FD so a voltage can be sampled onto the floating diffusion region VCL_FD via the transfer transistor 224.

The illustrated imager 110 also contains a control circuit 190, row decoder 192, row controller/driver 194, column S/H and readout circuitry 198, column decoder 196, readout/PGA gain amplifier 170, an analog-to-digital converter 180 and an image processor 185. Row lines RL connected to the pixels 120 and drivers 220 are selectively activated by the row control/driver 194 in response to the row address decoder 192. Output lines 232 from the drivers 220 are also connected to the column S/H and readout circuitry 198. It should be noted that pixel output lines (e.g., lines 132 in FIG. 4) for each column in the array are also connected to the column S/H and readout circuitry 198, but are not shown in FIG. 6 to avoid cluttering FIG. 6.

The CMOS imager 110 is operated by the control circuit 190, which controls the decoders 192, 196 for selecting the appropriate row RL and column lines (not shown) for pixel readout (via SELECT and COLUMN_SELECT signals, respectively). The control circuit 190 also controls the row control/driver and column S/H and readout circuitry 194, 198, which apply driving voltages to the drive transistors of the selected row and column lines. The control circuit 190 also controls other signals (e.g., SAMPLE_RESET, SAMPLE_SIGNAL, SAMPLE_VCL and CLAMP illustrated in FIG. 4) needed by the column S/H and readout circuitry 198 to readout, sample, hold and output reset and pixel signals.

The sample and hold portion of the column S/H and readout circuitry 198 reads and stores a pixel reset signal $V_{rst}$ and a pixel image signal $V_{sig}$ for the selected pixels 120. As set forth above, noise typically experienced during the readout process is suppressed due to the drivers 220. A differential signal ($V_{rst}$-$V_{sig}$) is produced by the differential amplifier 170 for each pixel and is digitized by the analog-to-digital converter 180. The analog-to-digital converter 180 supplies the digitized pixel signals to the image processor 185, which forms a digital image output.

It should be appreciated that an advantage of the invention is that it only requires minor changes to existing imaging devices. Only an extra row of pixels/drivers 220 is required to implement the noise suppression features of the invention. In addition, existing imagers use global clamp voltages driven with a wide metal line through all of the column circuits to reduce large RC noise components. With the driver 220 of the invention there is no voltage droop in the clamp voltage VCL driven into the column circuits because the voltage is buffered and driven locally.

Figure 7:
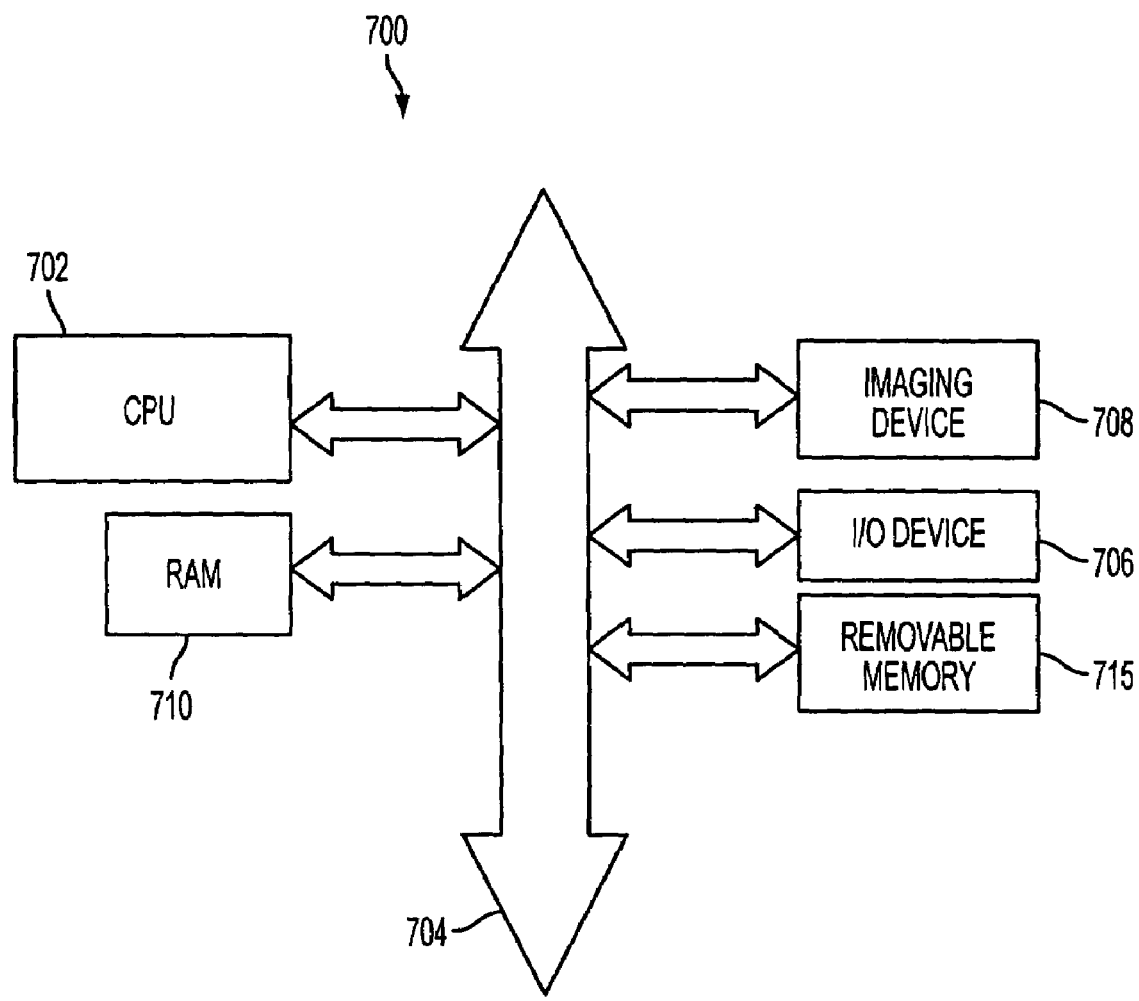
FIG. 7 shows a processor system incorporating at least one imaging device constructed in accordance with an embodiment of the invention.

FIG. 7 shows system 700, a typical processor system modified to include an imaging device 708 constructed in accordance with an embodiment of the invention (i.e., imager 110 of FIG. 6). The processor-based system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 700, for example a camera system, generally comprises a central processing unit (CPU) 702, such as a microprocessor, that communicates with an input/output (I/O) device 706 over a bus 704. Imaging device 708 also communicates with the CPU 702 over the bus 704. The processor-based system 700 also includes random access memory (RAM) 710, and can include removable memory 715, such as flash memory, which also communicate with the CPU 702 over the bus 704. The imaging device 708 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 110 of the invention as illustrated in FIGS. 4 and 6. For example, in one exemplary embodiment, a method of fabricating an integrated circuit imaging device, comprises forming an array of pixels organized into a plurality of rows and columns, each column having a column line; forming a plurality of clamp voltage drivers, each driver being associated with a respective column and outputting a clamp voltage on an output line; and forming a plurality of sample and hold circuits, each sample and hold circuit being associated with and connected to a respective column line and driver output line, each sample and hold circuit storing reset and pixel signals obtained from its respective column line based on the clamp voltage on its respective driver output line.

In one embodiment, each pixel includes a photosensor, a first floating diffusion region, a first transfer transistor connected between the photosensor and the first floating diffusion region, a first source follower transistor having a gate connected to the first floating diffusion region, and a first row select transistor connecting an output terminal of the first source follower transistor to the respective column line. In the same embodiment, each driver includes a second floating diffusion region, a second transfer transistor connected between a reference voltage source and the second floating diffusion region, a second source follower transistor having a gate connected to the second floating diffusion region, and a second row select transistor connecting an output terminal of the second source follower transistor to the respective output line.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A method of operating an imaging device, said method comprising the acts of:
    storing a reference voltage in a floating diffusion region;
    generating a clamp voltage from the voltage stored on the floating diffusion region; and
    using the generated clamp voltage to store reset and pixel signals readout from a corresponding imaging pixel,
    wherein the circuit that tracks noise has the same number of transistors as a number of transistors in the imaging pixel and has a transistor configuration that is the same as a transistor configuration of the imaging pixel.

2. The method of claim 1, wherein the floating diffusion region is contained in a circuit that tracks noise within the imaging pixel.

3. The method of claim 2, wherein an output line of the imaging pixel and an output line of the circuit are biased in a similar manner to track bias noise on the imaging pixel.

4. The method of claim 1, wherein the floating diffusion region is contained in a circuit that tracks substrate noise within the imaging pixel.

5. The method of claim 1, wherein the floating diffusion region is contained in a circuit that tracks supply noise within the imaging pixel.

6. The method of claim 1, wherein the floating diffusion region is contained in a circuit that tracks parasitic noise within the imaging pixel.

7. The method of claim 1, wherein said using step comprises:
 biasing an output line containing the generated clamp voltage;
 applying the clamp voltage over the biased line to a terminal of a first sample and hold element to store the reset signal; and
 applying the clamp voltage over the biased line to a terminal of a second sample and hold element to store the pixel signal.

8. The method of claim 7, wherein the sample and hold elements are capacitors.

9. A method of fabricating an integrated circuit imaging device, said method comprising the acts of:
 forming an array of pixels organized into a plurality of rows and columns, each column having a column line, each pixel comprising:
 a photosensor,
 a first floating diffusion region,
 a first transfer transistor connected between the photosensor and the first floating diffusion region,
 a first source follower transistor having a gate connected to the first floating diffusion region, and
 a first row select transistor connecting an output terminal of the first source follower transistor to the respective column line;
 forming a plurality of clamp voltage drivers, each driver being associated with a respective column and outputting a clamp voltage on an output line, each driver comprising:
 a second floating diffusion region,
 a second transfer transistor connected between a reference voltage source and the second floating diffusion region,
 a second source follower transistor having a gate connected to the second floating diffusion region, and
 a second row select transistor connecting an output terminal of the second source follower transistor to the respective output line; and
 forming a plurality of sample and hold circuits, each sample and hold circuit being associated with and connected to a respective column line and driver output line, each sample and hold circuit storing reset and pixel signals obtained from its respective column line based on the clamp voltage on its respective driver output line.

10. A method of fabricating an integrated circuit imaging device, said method comprising the acts of:
 forming an array of pixels organized into a plurality of rows and columns, each column having a column line;
 forming a plurality of clamp voltage drivers, each driver being associated with a respective column and outputting a clamp voltage on an output line, each driver is formed to have the same number of transistors as a number of transistors in a corresponding pixel in the array and has a transistor configuration that is the same as a transistor configuration of the corresponding pixel; and
 forming a plurality of sample and hold circuits, each sample and hold circuit being associated with and connected to a respective column line and driver output line, each sample and hold circuit storing reset and pixel signals obtained from its respective column line based on the clamp voltage on its respective driver output line.

11. An imaging device comprising:
 an array of pixels organized into a plurality of rows and columns, each column having a column line;
 a plurality of clamp voltage drivers, each driver being associated with a respective column, each driver generating a clamp voltage from reference voltage and outputting the generated clamp voltage on a respective driver output line; and
 a plurality of sample and hold circuits, each sample and hold circuit being associated with and connected to a respective column line and driver output line, each sample and hold circuit storing reset and pixel signals obtained from its respective column line based on the clamp voltage on its respective driver output line, wherein each driver circuit comprises:
 a floating diffusion region for storing the reference voltage,
 a source follower transistor for converting the stored reference voltage into the clamp voltage, and
 a row select transistor for selectively outputting the clamp voltage onto the respective driver output line.

12. The device of claim 11, wherein each driver contains a circuit that tracks noise within imaging pixels of its associated column.

13. The device of claim 11, wherein each driver contains a circuit that is substantially similar to output circuitry within imaging pixels of its associated column.

14. The device of claim 11, wherein each sample and hold circuit comprises biasing circuitry for biasing the respective column line and driver output line.

15. The device of claim 11, wherein each driver circuit further comprises a transfer transistor for transferring the reference voltage to the floating diffusion region based on a control signal.

16. The device of claim 11, wherein each driver contains a circuit that tracks substrate noise within imaging pixels of its associated column.

17. The device of claim 11, wherein each driver contains a circuit that tracks supply noise within imaging pixels of its associated column.

18. The device of claim 11, wherein each driver contains a circuit that tracks parasitic noise within imaging pixels of its associated column.

19. An imaging device comprising:
 an array of pixels organized into a plurality of rows and columns, each column having a column line;
 a plurality of first circuits, each first circuit being associated with a respective column, each first circuit for suppressing column-wise pixel noise in its associated column, each first circuit comprising:
 means for storing a reference voltage in a storage region,
 means for generating a clamp voltage from the stored reference voltage, and
 means for using the generated clamp voltage to store reset and pixel signals readout from a corresponding imaging pixel, wherein each first circuit has the same number of transistors as a number of transistors in the corresponding image pixel and has a transistor configuration that is the same as a transistor configuration of the corresponding pixel.

20. A processor system comprising:

a processor; and an imaging device coupled to said processor, said imaging device comprising:

an array of pixels organized into a plurality of rows and columns, each column having a column line, a plurality of clamp voltage drivers, each driver being associated with a respective column, each driver generating a clamp voltage from reference voltage and outputting the generated clamp voltage on a respective driver output line, and a plurality of sample and hold circuits, each sample and hold circuit being associated with and connected to a respective column line and driver output line, each sample and hold circuit storing reset and pixel signals obtained from its respective column line based on the clamp voltage on its respective driver output line, wherein each driver circuit comprises:

a floating diffusion region for storing the reference voltage, a source follower transistor for converting the stored reference voltage into the clamp voltage, and a row select transistor for selectively outputting the clamp voltage onto the respective driver output line.

21. The system of claim 20, wherein each driver contains a circuit that tracks noise within imaging pixels of its associated column.

22. The system of claim 20, wherein each driver contains a circuit that is substantially similar to output circuitry within imaging pixels of its associated column.

23. The system of claim 20, wherein each sample and hold circuit comprises biasing circuitry for biasing the respective column line and driver output line.

24. The system of claim 20, wherein each driver circuit further comprises a transfer transistor for transferring the reference voltage to the floating diffusion region based on a control signal.

25. The system of claim 20, wherein each driver contains a circuit that tracks substrate noise within imaging pixels of its associated column.

26. The system of claim 20, wherein each driver contains a circuit that tracks supply noise within imaging pixels of its associated column.

27. The system of claim 20, wherein each driver contains a circuit that tracks parasitic noise within imaging pixels of its associated column.

28. A processor system comprising:

a processor; and an imaging device coupled to said processor, said imaging device comprising an array of pixels organized into a plurality of rows and columns, each column having a column line and a plurality of first circuits, each first circuit being associated with a respective column, each first circuit for suppressing column-wise pixel noise in its associated column, each first circuit comprising:

means for storing a reference voltage in a storage region, means for generating a clamp voltage from the stored reference voltage, and means for using the generated clamp voltage to store reset and pixel signals readout from a corresponding imaging pixel, wherein each first circuit has the same number of transistors as a number of transistors in the corresponding image pixel and has a transistor configuration that is the same as a transistor configuration of the corresponding pixel.

\* \* \* \* \*